United States Patent [19]

Kalina

[11] Patent Number: 5,029,444
[45] Date of Patent: Jul. 9, 1991

[54] METHOD AND APPARATUS FOR CONVERTING LOW TEMPERATURE HEAT TO ELECTRIC POWER

[76] Inventor: Alexander I. Kalina, 105 Glen Garry Way, Hillsborough, Calif. 94010

[21] Appl. No.: 567,914

[22] Filed: Aug. 15, 1990

[51] Int. Cl.⁵ .............................................. F01K 25/06
[52] U.S. Cl. ........................................ 60/673; 60/649
[58] Field of Search .................................. 60/649, 673

[56] References Cited

U.S. PATENT DOCUMENTS

| | | |
|---|---|---|
| 4,346,561 | 8/1982 | Kalina . |
| 4,489,563 | 12/1984 | Kalina . |
| 4,548,043 | 10/1985 | Kalina . |
| 4,586,340 | 5/1986 | Kalina . |
| 4,604,867 | 8/1986 | Kalina . |
| 4,732,005 | 3/1988 | Kalina . |
| 4,763,480 | 8/1988 | Kalina . |
| 4,899,545 | 2/1990 | Kalina . |

OTHER PUBLICATIONS

Burns & McDonnell Engineering Co., "Heber Geothermal Binary Demonstration Plant: Design, Construction, and Early Startup," EPRI, Oct. 1987.
Bliem, "Aspects of the Kalina Technology Applied to Geothermal Power Production," Idaho National Engineering Laboratory, Sep. 21, 1989.

Primary Examiner—Allen M. Ostrager
Attorney, Agent, or Firm—Arnold, White & Durkee

[57] ABSTRACT

A method and apparatus for implementing a thermodynamic cycle which may be used to convert low temperature heat to electric power.

13 Claims, 1 Drawing Sheet

METHOD AND APPARATUS FOR CONVERTING LOW TEMPERATURE HEAT TO ELECTRIC POWER

BACKGROUND OF THE INVENTION

This invention relates generally to the field of thermal energy conversion into mechanical and then electrical form. More particularly, this invention relates to the conversion of low temperature heat from low temperature heat sources into electric power.

Methods for converting the thermal energy of low temperature heat sources into electric power present an important area of energy generation. There is a need for a method and apparatus for increasing the efficiency of the conversion of such low temperature heat to electric power that exceeds the efficiency of standard Rankine cycles. The present invention provides such a method and apparatus.

SUMMARY OF THE INVENTION

The present invention provides for a method for implementing a thermodynamic cycle comprising the steps of:
- expanding a gaseous working stream, transforming its energy into usable form and producing a spent stream;
- condensing the spent stream producing a liquid working stream;
- forming from the liquid working stream an enriched stream and a lean stream; and
- heating the enriched stream forming the gaseous working stream.

The present invention also provides for an apparatus for implementing a thermodynamic cycle comprising:
- means for expanding a gaseous working stream, transferring its energy into usable form and producing a spent stream;
- a first stream mixer for mixing the spent stream with a lean stream forming a pre-condensed stream;
- a condenser for condensing the pre-condensed stream producing a liquid working stream;
- a pump for pumping the liquid working stream to an increased pressure;
- a gravity separator for forming from the liquid working stream a vapor stream and a first liquid stream;
- a first stream separator for separating the first liquid stream producing a second liquid stream and the lean stream;
- a second stream mixer for mixing the second liquid stream with the vapor stream producing an enriched stream; and
- a heat exchanger for heating the enriched stream with heat transferred from an external heat source producing the gaseous working stream.

Although any conventional external heat source may, in general, be used in conjunction with the method and apparatus of the present invention, the present invention is particularly useful for the conversion of low temperature heat from a low temperature geothermal brine or from a solar pond. As will be apparent from the following description of preferred embodiments, the method and apparatus of the present invention may enhance the efficiency of the conversion of low temperature heat to electric power for a power cycle that uses a low temperature heat source.

DESCRIPTION OF PREFERRED EMBODIMENTS

Figure 1:
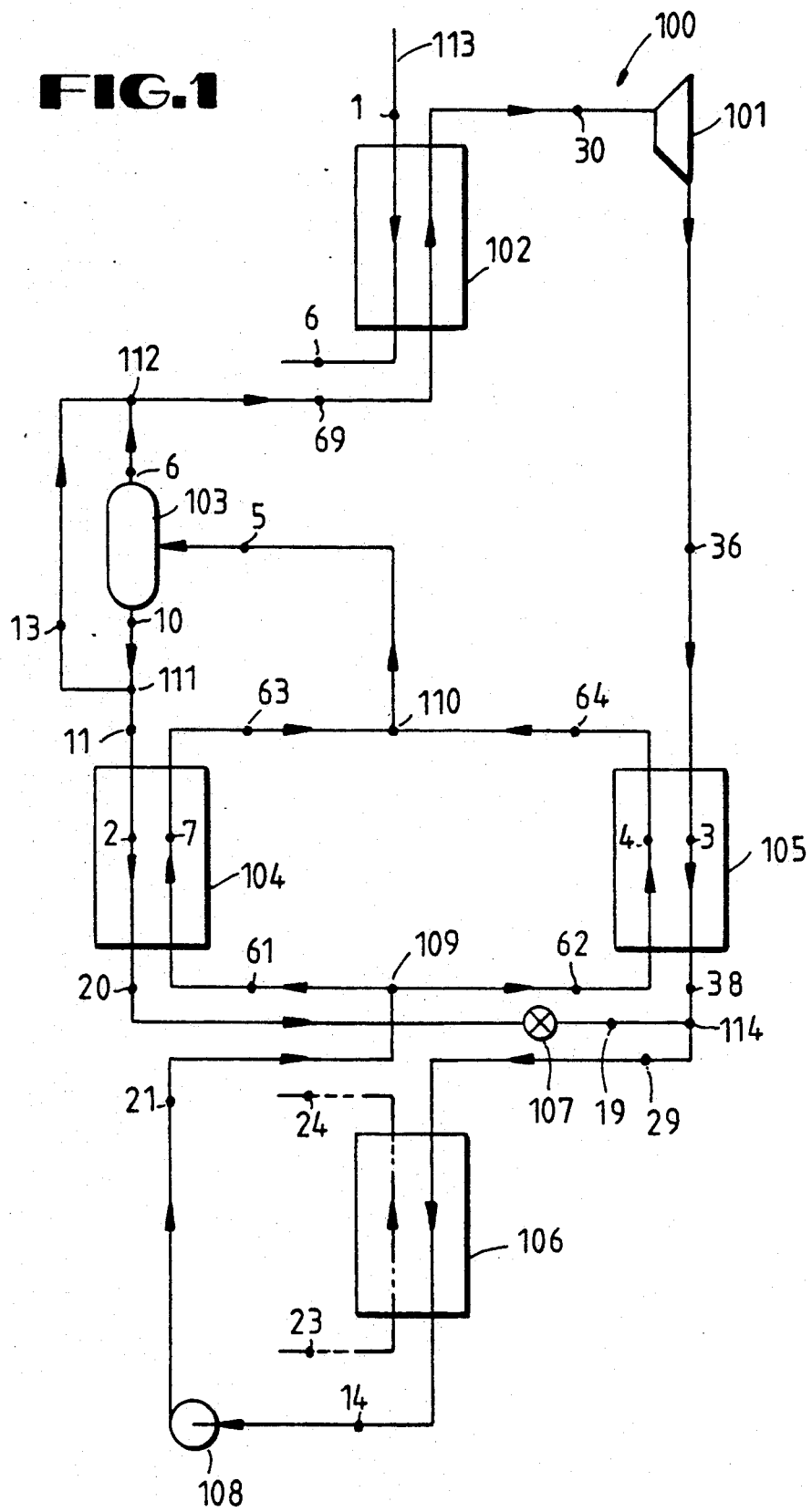
FIG. 1 is a schematic representation of an embodiment of the method and apparatus of the present invention.

This invention is a novel method and apparatus for implementing a thermodynamic cycle. In the method of the present invention, a gaseous working stream is expanded. This expansion transforms that stream's energy into usable form and produces a spent stream. Preferred expansion means include conventionally used turbines or turbine systems. The spent stream is condensed producing a liquid working stream. Preferred condensers are those conventionally used in the art.

From the liquid working stream, an enriched stream and a lean stream are formed. The enriched stream preferably includes a higher percentage of a low boiling component than the liquid working stream includes. The lean stream preferably includes a lower percentage of a low boiling component than the liquid working stream includes.

Any conventional apparatus used to form two or more streams having different compositions from a single stream may be used to form the lean stream and the enriched stream from the liquid working stream. Preferred means for forming those streams include conventionally used gravity separators, such as a conventional flash tank.

The enriched stream preferably is in the state of a vapor or a vapor-liquid mixture. The lean stream preferably is in the state of a saturated or subcooled liquid.

The enriched stream is heated to form the gaseous working stream. This heat transfer may occur via a conventional heat exchanger. Any conventional heating source may be used, including recuperative or external heat sources. Preferred external heat sources that may be used in the present invention are those having temperatures of less than about 400° F. Particularly preferred are those having temperatures of less than about 250° F., such as low temperature geothermal brine or solar pond external heat sources.

The method of the present invention preferably includes the additional step of combining at a first stream mixer the lean stream with the spent stream prior to condensing the spent stream to form the liquid working stream. Such a stream, which includes the lean stream and the spent stream, may be referred to as a pre-condensed stream.

The method of the present invention preferably includes the additional steps of pumping the liquid working stream to an increased pressure and partially evaporating the liquid working stream with heat transferred from the spent stream and the lean stream. Conventional pumps and heat exchangers may be used for such purposes.

In the embodiment of the present invention in which the liquid working stream is partially evaporated, the enriched stream and the lean stream may be formed by separating vapor and liquid streams from the partially evaporated liquid working stream at a flash tank—the vapor producing the enriched stream, which is heated to form the gaseous working stream, and the liquid producing the lean stream. Alternatively, such a partially evaporated liquid working stream may be separated into a vapor stream and a first liquid stream at a flash tank. The first liquid stream, in turn, may be separated at a first stream separator into a second liquid stream and the lean stream. The second liquid stream may then be mixed at a second stream mixer with the vapor stream to produce the enriched stream. In such an embodiment of the present invention, the enriched stream should be in the state of a vapor-liquid mixture that is then heated to form the gaseous working stream.

The schematic shown in FIG. 1 shows an embodiment of preferred apparatus that may be used in the method of the present invention. Specifically, FIG. 1 shows a system 100 that includes turbine 101, heat exchangers 104, 105 and 102, condenser 106, gravity separator 103, pump 108, stream separators 109 and 111, stream mixers 110, 112 and 114, and external heat source 113.

The condenser 106 may be any type of known heat rejection device. For example, the condenser 106 may take the form of a heat exchanger, such as a water cooled system, or another type of condensing device.

Various types of heat sources may be used to drive the cycle of this invention. In the embodiment shown in FIG. 1, external heat source 113 represents a stream of low temperature geothermal fluid that flows from point 1 to point 9 through heat exchanger 102.

The working stream for the embodiment of the present invention shown in system 100 preferably is a multi-component working stream that comprises a low boiling component and a high boiling component. Such a preferred working stream may be an ammonia-water mixture, two or more hydrocarbons, two or more freons, mixtures of hydrocarbons and freons, or the like. In general, the working stream may be mixtures of any number of compounds with favorable thermodynamic characteristics and solubility. In a particularly preferred embodiment, a mixture of water and ammonia is used.

As shown in FIG. 1, the working stream circulates through system 100. The working stream includes a gaseous working stream that flows from heat exchanger 102 to turbine 101. The working stream also includes a spent stream, which flows from turbine 101 to first stream mixer 114, a pre-condensed stream, which flows from first stream mixer 114 to condenser 106, a liquid working stream, which flows from condenser 106 to gravity separator 103, and an enriched stream, which flows from second stream mixer 112 to heat exchanger 102. The gaseous working stream, the spent stream, and the enriched stream preferably each include a higher percentage of a low boiling component than is included in the pre-condensed stream and the liquid working stream.

In addition to the working stream that circulates through system 100 are a lean stream, which flows from first stream separator 111 to first stream mixer 114, a first liquid stream, which flows from gravity separator 103 to first stream separator 111, a second liquid stream, which flows from first stream separator 111 to second stream mixer 112, and a vapor stream, which flows from gravity separator 103 to second stream mixer 112. The lean stream, the first liquid stream, and the second liquid stream preferably each include a lower percentage of a low boiling component than is included in the liquid working stream. The vapor stream preferably includes a higher percentage of a low boiling component than is included in the liquid working stream.

In the embodiment of the present invention shown in FIG. 1, the liquid working stream, which has been completely condensed and which has a temperature that preferably is close to ambient temperature—with parameters as at point 14—is pumped by pump 108 to a higher pressure, obtaining parameters as at point 21. Thereafter, this liquid working stream is separated at stream separator 109 producing substreams with parameters as at points 61 and 62, respectively. These substreams are sent into recuperative heat exchangers 104 and 105, respectively. While passing through heat exchangers 104 and 105, the substreams of the liquid working stream are heated, achieving a boiling temperature having parameters as at points 7 and 4, respectively, and then partially evaporated. The partially evaporated substreams of the liquid working stream exit heat exchangers 104 and 105 with parameters as at points 63 and 64, respectively. Those substreams are then recombined at stream mixer 110 to reconstitute the liquid working stream with parameters as at point 5.

The liquid working stream at point 5 is preferably in a bi-phase state, i.e., in a partially evaporated state. The liquid working stream is sent into gravity separator 103, such as a flash tank, where the liquid separates from the vapor.

A vapor stream with parameters as at point 6 exits from the top of gravity separator 103 and a first liquid stream, with parameters as at point 10, exits from the bottom of gravity separator 103. The first liquid stream is separated at first stream separator 111 into a lean stream and a second liquid stream having parameters as at points 11 and 13, respectively. The second liquid stream, with parameters as at point 13, is combined at second stream mixer 112 with the vapor stream producing an enriched stream (enriched in this embodiment of the present invention with respect to a lower boiling component when compared to the liquid working stream) having parameters as at point 69. The enriched stream preferably is in the state of a vapor-liquid mixture.

The enriched stream is sent into heat exchanger 102 where it is heated by external heat source 113. The external heat source 113 shown in FIG. 1 represents a stream of geothermal brine. Such a heat source typically has a temperature of less than about 400° F., and may have a temperature of less than about 250° F. Alternatively, external heat source 113 may consist of some other type of low temperature stream, such as one flowing from a solar pond. In the embodiment shown in FIG. 1, the geothermal brine enters heat exchanger 102 with parameters as at point 1 and exits heat exchanger 102 with parameters as at point 9. As shown in TABLE 1, the geothermal brine at point 1 may be at a temperature of 230° F.

The enriched stream that enters heat exchanger 102 is further heated and evaporated, exiting heat exchanger 102 as the gaseous working stream. The gaseous working stream exiting heat exchanger 102 may be partially evaporated, or it may be completely evaporated and superheated.

The gaseous working stream in the FIG. 1 embodiment exits heat exchanger 102 with parameters as at point 30. The gaseous working stream then enters turbine 101 where it expands, producing work. A spent stream exits from turbine 101 with parameters as at point 36. That spent stream is sent into heat exchanger 105 where it is cooled. The spent stream is preferably partially condensed as it passes through heat exchanger 105 to obtain parameters as at point 38. As it passes through heat exchanger 105, the spent stream transfers heat for heating and preferably partially evaporating the substream of the liquid working stream flowing from point 62 to point 64.

The lean stream, with parameters as at point 11, passes through heat exchanger 104, where it is cooled. While passing through heat exchanger 104, the lean stream provides heat for pre-heating and preferably partially evaporating the substream of the liquid working stream flowing from point 61 to point 63. The lean stream exits heat exchanger 104 with parameters as at point 20. In the embodiment shown in FIG. 1, the lean stream passes through a pressure reduction device 107, which may be a throttle valve. After exiting pressure reduction device 107, the lean stream obtains parameters as at point 19.

The lean stream and the spent stream are combined at first stream mixer 114 to produce a pre-condensed stream having parameters as at point 29. The pre-condensed stream is sent into condenser 106, where it is completely condensed by a stream of coolant flowing from point 23 to point 24. This produces the liquid working stream, with parameters as at point 14, which completes the cycle.

Convenient parameters for the points corresponding to the points set forth in FIG. 1 are presented in TABLE 1 for a system having a water-ammonia enriched stream which includes 49.5 weight % of ammonia. The theoretical performance of the system of the present invention, using the parameters of TABLE 1 in the embodiment shown in FIG. 1, is included in TABLE 2. The data presented in that table shows that the proposed system theoretically should have an efficiency of 10.34%, which should exceed the efficiency of the standard Rankine cycle, working at the same border conditions, by about 1.67 times. It should be expected that use of the heat source proposed for the embodiment shown in FIG. 1, with parameters as set forth in TABLE 1, should increase power output from 3.3 MW to 5.5 MW.

TABLE 1

| Point | P(psia) | X | T° F. | H (Btu/lb) | G |
|---|---|---|---|---|---|
| 1 | — | BRINE | 230.00 | — | 9.6554 |
| 2 | 37.90 | 0.2651 | 138.56 | 30.93 | 7.4728 |
| 3 | 9.97 | 0.4950 | 138.56 | 467.66 | 1.0000 |
| 4 | 40.10 | 0.2922 | 134.56 | 20.82 | 2.9728 |
| 5 | 38.10 | 0.2922 | 142.00 | 58.54 | 8.4728 |
| 6 | 38.10 | 0.9408 | 142.00 | 634.62 | .3403 |
| 7 | 40.10 | 0.2922 | 134.56 | 20.82 | 5.5000 |
| 9 | — | BRINE | 170.62 | — | 9.6554 |
| 10 | 38.10 | 0.2651 | 142.00 | 34.44 | 8.1325 |
| 11 | 38.10 | 0.2651 | 142.00 | 34.44 | 7.4728 |
| 13 | 38.10 | 0.2651 | 142.00 | 34.44 | .6597 |
| 14 | 8.72 | 0.2922 | 62.00 | −54.06 | 8.4728 |
| 19 | 9.22 | 0.2651 | 76.79 | −24.12 | 7.4728 |
| 20 | 37.70 | 0.2651 | 85.03 | −24.12 | 7.4728 |
| 21 | 42.10 | 0.2922 | 62.00 | −53.99 | 8.4728 |
| 23 | — | WATER | 55.00 | — | 17.4588 |
| 24 | — | WATER | 84.96 | — | 17.4588 |
| 29 | 9.22 | 0.2922 | 78.76 | 7.68 | 8.4728 |
| 30 | 33.10 | 0.4950 | 217.50 | 823.45 | 1.0000 |
| 36 | 10.72 | 0.4950 | 165.00 | 761.36 | 1.0000 |
| 38 | 9.22 | 0.4950 | 94.37 | 245.29 | 1.0000 |
| 61 | 42.10 | 0.2922 | 62.00 | −53.99 | 5.5000 |
| 62 | 42.10 | 0.2922 | 62.00 | −53.99 | 2.9728 |
| 63 | 38.10 | 0.2922 | 133.58 | 25.53 | 5.5000 |
| 64 | 38.10 | 0.2922 | 158.00 | 119.61 | 2.9728 |
| 69 | 38.10 | 0.4950 | 142.00 | 238.67 | 1.0000 |

TABLE 2

| Sum of turbine enthalpy drops = | 62.08 Btu/lb |
|---|---|
| Turbine work = | 60.53 Btu/lb |
| Heat input = | 84.78 Btu/lb |

TABLE 2-continued

| Heat rejection = | 523.04 Btu/lb |
|---|---|
| Pump power = | .09 Btu/lb |
| Net power output = | 60.44 Btu/lb |
| Net thermal efficiency = | 10.34% |
| Working fluid weight flow = | 310705.84 |
| Net output | 5502.59 kWe |
| Second Law limit | 20.90% |
| Second Law efficiency | 49.45% |
| Specific brine consumption | 545.20 lb/kWe |
| Specific power output | 1.83 watt-hr/lb |

While the present invention has been described with respect to a number of preferred embodiments, which utilize a single preferred external heat source, those skilled in the art will appreciate a number of variations and modifications of those embodiments. For example, a different external heat source may be used, the number of heat exchangers may be increased or decreased, the number of pumps, turbines, condensing devices, separators, etc., may be varied, as well as the number and composition of streams flowing through the cycle. Thus, it is intended that the appended claims cover all such variations and modifications as fall within the true spirit and scope of the present invention.

What is claimed is:

1. A method for implementing a thermodynamic cycle comprising the steps of:
   expanding a gaseous working stream, transforming its energy into usable form and producing a spent stream;
   mixing with the spent stream a lean stream forming a pre-condensed stream;
   condensing the pre-condensed stream producing a liquid working stream;
   forming from the liquid working stream an enriched stream and the lean stream; and
   heating the enriched stream forming the gaseous working stream.

2. The method of claim 1 further including the step of heating the enriched stream with heat transferred from an external heat source having a temperature of less than about 400° F.

3. The method of claim 2 further including the step of heating the enriched stream with heat transferred from an external heat source having a temperature of less than about 250° F.

4. The method of claim 3 wherein the external heat source is selected from the group consisting of a low temperature geothermal brine and a solar pond.

5. The method of claim 1 further including the steps of pumping the liquid working stream to an increased pressure and partially evaporating the liquid working stream with heat transferred from the spent stream and the lean stream after pumping the liquid working stream to an increased pressure.

6. A method for implementing a thermodynamic cycle comprising the steps of:
   expanding a gaseous working stream, transforming its energy into usable form and producing a spent stream;
   mixing with the spent a lean stream forming a pre-condensed stream;
   condensing the pre-condensed stream producing a liquid working stream;
   pumping the liquid working stream to an increased pressure;

partially evaporating the liquid working stream with heat transferred from the spent stream and the lean stream;

forming from the liquid working stream a vapor stream and a first liquid stream;

separating the first liquid stream producing a second liquid stream and the lean stream;

mixing the second liquid stream with the vapor stream producing an enriched stream; and heating the enriched stream with heat transferred from an external heat source producing the gaseous working stream.

7. The method of claim 6 wherein the gaseous working stream, the spent stream, the lean stream, the pre-condensed stream, the liquid working stream, the first liquid stream, the second liquid stream, the vapor stream, and the enriched stream each comprise a low boiling component and a high boiling component.

8. Apparatus for implementing a thermodynamic cycle comprising:

means for expanding a gaseous working stream, transferring its energy into usable form and producing a spent stream;

a first stream mixer for mixing the spent stream with a lean stream forming a pre-condensed stream;

a condenser for condensing the pre-condensed stream producing a liquid working stream;

a pump for pumping the liquid working stream to an increased pressure;

a gravity separator for forming from the liquid working stream a vapor stream and a first liquid stream;

a first stream separator for separating the first liquid stream producing a second liquid stream and the lean stream;

a second stream mixer for mixing the second liquid stream with the vapor stream producing an enriched stream; and a heat exchanger for heating the enriched stream with heat transferred from an external heat source producing the gaseous working stream.

9. The apparatus of claim 8 further including a gaseous working stream, a spent stream, a lean stream, a pre-condensed stream, a liquid working stream, a first liquid stream, a second liquid stream, a vapor stream, and an enriched stream that each comprise a low boiling component and a high boiling component.

10. The apparatus of claim 8 further including a second heat exchanger for heating the liquid working stream with heat transferred from the lean stream, and a third heat exchanger for heating the liquid working stream with heat transferred from the spent stream.

11. The apparatus of claim 8 further including an external heat source having a temperature of less than about 400° F.

12. The apparatus of claim 11 wherein the external heat source has a temperature of less than about 250° F.

13. The apparatus of claim 12 wherein the external heat source is selected from the group consisting of a low temperature geothermal brine and a solar pond.

* * * * *

UNITED STATES PATENT AND TRADEMARK OFFICE
CERTIFICATE OF CORRECTION

PATENT NO.  : 5,029,444

DATED       : July 9, 1991

INVENTOR(S) : Alexander I. Kalina

It is certified that error appears in the above-identified patent and that said Letters Patent is hereby corrected as shown below:

Column 6, line 63:
In claim 6, line 6, please insert --stream-- after "spent".

Signed and Sealed this

Eighth Day of December, 1992

Attest:

DOUGLAS B. COMER

Attesting Officer

Acting Commissioner of Patents and Trademarks